W. F. KOELPIN.
CALIPERING TOOL.
APPLICATION FILED MAR. 27, 1913.
1,196,789.
Patented Sept. 5, 1916.
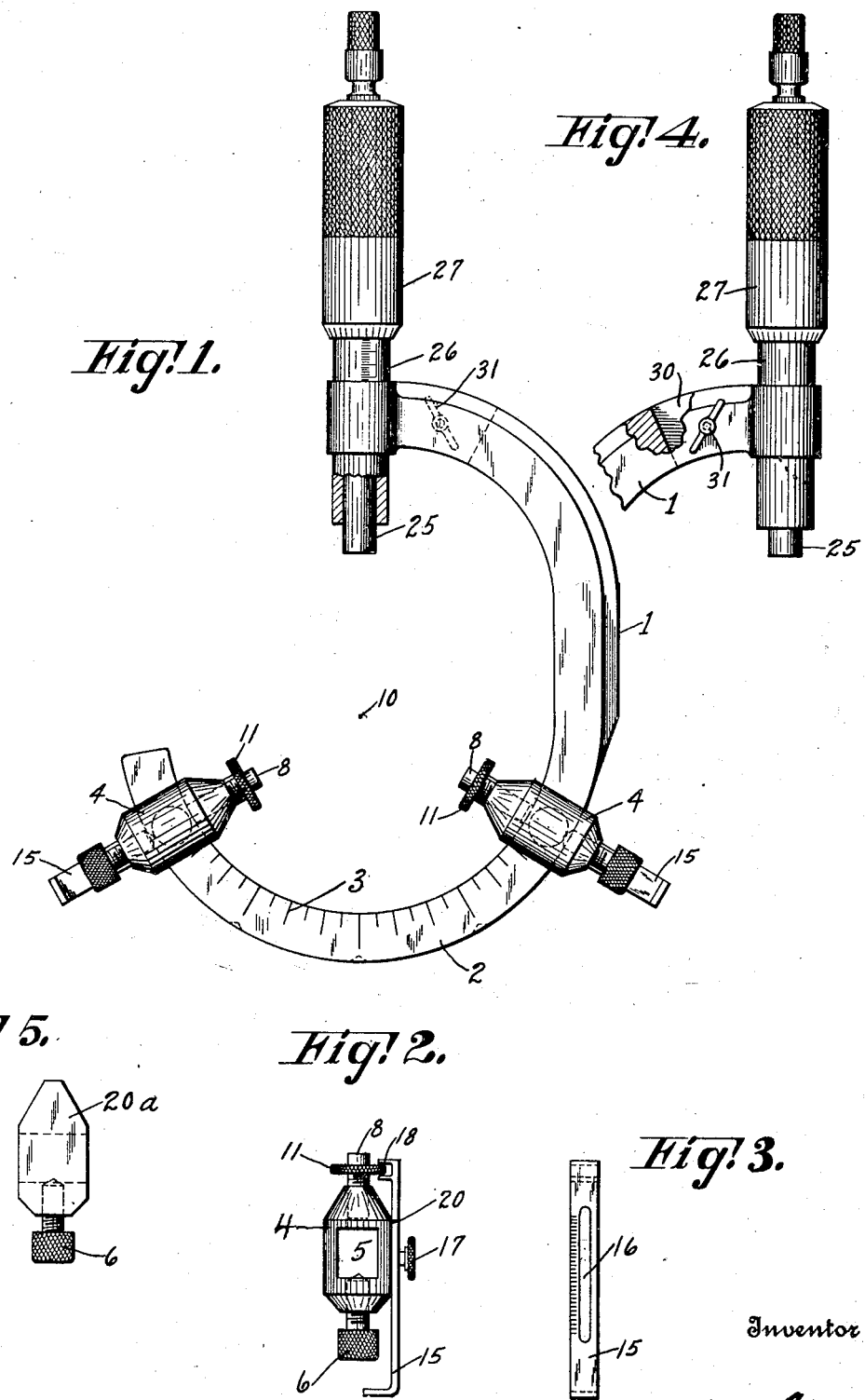

UNITED STATES PATENT OFFICE.

WILLIAM F. KOELPIN, OF MILWAUKEE, WISCONSIN, ASSIGNOR OF ONE-HALF TO CHARLES J. KAISER, OF MILWAUKEE, WISCONSIN.

CALIPERING-TOOL.

1,196,789.

Specification of Letters Patent.

Patented Sept. 5, 1916.

Application filed March 27, 1913. Serial No. 757,122.

*To all whom it may concern:*

Be it known that I, WILLIAM F. KOELPIN, a citizen of the United States, residing at Milwaukee, county of Milwaukee, and State of Wisconsin, have invented new and useful Improvements in Calipering-Tools, of which the following is a specification.

The object of my invention is to provide an improved form of calipering tool which will be adapted not only for testing and ascertaining diameters, but also for testing circular contours and accurately measuring the extent of such irregularities as may be found to exist.

In the drawings Figure 1 is a side view of a calipering tool embodying my invention. Fig. 2 is a detail view of one of the adjustable pin supporting members. Fig. 3 is a detail view of one of the scale plates employed to indicate the adjustment of the pin in its mounting. Fig. 4 is a reversed view of the upper part of the yoke. Fig. 5 is a detail view of a modified form of abutment member.

Like parts are identified by the same reference characters throughout the several views.

The yoke 1 is provided with a curved segment 2 having a degree index 3. The segment 2 is angular in cross section and a set of pin supporting members 4 are adjustably supported by the segment 2, each of the members 4 being provided with an opening 5 to receive the segment 2, and a set screw 6 upon each member 4 is employed to hold it in the desired position of adjustment. Pins 8 are threaded at their inner ends and mounted in threaded sockets formed in the members 4 with their axes at right angles to the segment 2, whereby said pins will be supported with their inner extremities pointing toward a center at 10 about which the segment curves. Thumb collars 11 rigid on the pins 8 are employed for adjusting the pins 8 in the members 4.

A scale plate 15 is provided with a slot 16 through which a set screw 17 passes to connect it with the member 4. The inner end of this scale plate is provided with a fork 18 which loosely embraces the collar 11, whereby any change in the adjustment of the pin 8 will be registered by the scale plate 15, the latter being provided with gage marks to indicate the extent of pin adjustment. The collar 11 and pin 8 are therefore locked in position by the scale plate 15. When it is desired to change the adjustment of the pins 8, the set screws 17 on the respective members 4 are slightly loosened, whereupon the collar 11 will be turned until the proper readjustment is indicated by the gage marks upon the scale plate. Each member 4 is provided with an index mark or pointer at 20, past which the scale with the gage marks thereon moves when the pin 8 is being adjusted. A third pin 25 projects toward the center 10 through the upper end of the yoke 1. This pin is seated in a tubular member 26 carried by the yoke 1, and projects into a rotary barrel 27 which is in motion transmitting connection with the pin 25, adapted, when the barrel 27 is rotated, to move pin 25 inwardly or outwardly in the ordinary manner. It is not deemed necessary to illustrate this mechanism, since, for the purpose hereof, it may be regarded as the ordinary michometer gage mechanism.

It will be observed that there are two members 4 upon the segment 2, the pins 8 of which coöperate with the pin 25 in providing a three-point bearing upon a cylindrical object, the center of which is located at the point 10. Assuming that a shaft one inch in diameter is to be tested, the pins 8 will first be adjusted until the scale plates 15 indicate that the inner extremities of the pins are each in a position one half inch from the center point 10. A device may then be applied to the shaft and the barrel 27 rotated until pin 25 is in contact with the shaft, whereupon the tool may be oscillated, and if the shaft is not cylindrical, the irregularities may be at once detected. In case a portion of the periphery of the shaft is found to be "out of round", it will then be possible, by readjusting the members 4 upon segment 2, to ascertain the area of the irregularities in degrees as indicated upon the gage marks 3. When it is desired to test diameters, one of the members 4 may be removed and the other one adjusted at a point directly opposite the pin 25, but where it is desired to use the tool for testing diameters, it will of course be necessary that the adjustment of the pins 8 be very accurately indicated by the scale plates 15. The tool, however, will ordinarily be used principally for the purpose of testing the curvature instead of testing the diameter of the object to which it is applied.

It will be understood that the index scale 3 on the segment 2 is adapted to indicate the axial line of the micrometer pin 25, projected. This may be done by employing an index mark in connection with a zero character and from which the scale index extends in graduated marks of progressive value on either side. The members 4 will be normally adjusted at equal distances from the zero mark.

The pins 8 form abutments which are adjusted with reference to the micrometer calipering pin 25 preparatory to the adjustment of the latter in its support. In Fig. 4 I have shown how the pin support 26 is adjustable in the yoke 1. The latter is slitted at 30 and a clamping set screw 31 is employed to lock the sleeve in any desired position. This allows of a quick adjustment of pin 25 for work of different sizes preparatory to the micrometer adjustment for measuring purposes. In this construction, members $20^a$, without adjustable pins, (Fig. 5), may be used in place of the members 4, since if the pin 25 is capable of a quick adjustment, it is not necessary that adjustable pins 8 should be employed.

I claim—

1. A calipering tool comprising an open sided hook shaped yoke provided at one end with a micrometer pin, said yoke including a segment in a position extending across the axis of the pin projected, and curving about a center located between the segment and said pin, a set of pin supporting members mounted on said segment, and adapted for longitudinal adjustment thereon and a calipering pin supported by each of said members and axially adjustable with reference thereto.

2. A calipering tool comprising a supporting open sided hook shaped yoke provided at one end with a micrometer pin, said yoke including a segment positioned to extend across the axis of the pin projected, a set of pin supporting members provided with slots through which said segment passes, set screws carried by said members and adapted to engage said segment, and calipering pins mounted in threaded sockets in the inner ends of said members and adapted to be axially adjusted in said sockets.

3. A calipering tool comprising a supporting open sided hook shaped yoke provided at one end with a micrometer pin, said yoke including a segment positioned to extend across the axis of the pin projected, a set of pin supporting members provided with slots through which said segment passes, set screws carried by said members and adapted to engage said segment, and calipering pins mounted in threaded sockets in the inner ends of said members and adapted to be axially adjusted in said sockets, together with means for locking said calipering pins against rotation in any desired position of adjustment.

In testimony whereof I affix my signature in the presence of two witnesses.

WILLIAM F. KOELPIN.

Witnesses:
 LYMAN G. WHEELER,
 R. S. WITTE.